United States Patent
Lamb

[11] Patent Number: 6,047,749
[45] Date of Patent: Apr. 11, 2000

[54] STUMP GRINDING APPARATUS

[76] Inventor: Rodney Lamb, 6920 Bonanza La., Weidman, Mich. 48893

[21] Appl. No.: 09/207,782

[22] Filed: Dec. 9, 1998

[51] Int. Cl.⁷ .................................................. A01G 23/06
[52] U.S. Cl. ......................... 144/24.12; 37/302; 144/334; 144/218; 144/235; 144/241; 241/101.72; 407/113
[58] Field of Search ........................ 37/301, 302; 83/928; 144/24.12, 334, 34.1, 241, 235, 218; 241/101.72; 407/34, 42, 47, 48, 113

[56] References Cited

U.S. PATENT DOCUMENTS

| | | |
|---|---|---|
| 3,389,726 | 6/1968 | Good .................................... 144/24.12 |
| 3,797,544 | 3/1974 | Ver Ploeg .............................. 144/235 |
| 3,845,796 | 11/1974 | Moore ..................................... 144/1.1 |
| 3,868,980 | 3/1975 | Blüm ..................................... 144/24.12 |
| 4,271,879 | 6/1981 | Shivers, Jr. et al. ................. 144/24.12 |
| 4,402,352 | 9/1983 | Hodges ................................ 144/24.12 |
| 4,593,733 | 6/1986 | Hamilton .............................. 144/34.1 |
| 4,690,183 | 9/1987 | Eilertson .............................. 144/24.12 |
| 4,697,625 | 10/1987 | Bolton .................................. 144/24.12 |
| 4,738,291 | 4/1988 | Isley ...................................... 144/241 |
| 4,759,394 | 7/1988 | Clemenson ............................. 144/235 |
| 4,827,995 | 5/1989 | Wilson ................................. 144/24.12 |
| 4,932,447 | 6/1990 | Morin .................................... 144/241 |
| 4,974,649 | 12/1990 | Manning ................................ 144/235 |
| 4,998,574 | 3/1991 | Beach et al. .......................... 144/241 |
| 5,203,388 | 4/1993 | Bowling ............................... 144/24.12 |
| 5,211,212 | 5/1993 | Carlson et al. ........................ 144/241 |
| 5,261,306 | 11/1993 | Morey .................................... 144/241 |
| 5,289,859 | 3/1994 | Minton, Jr. et al. ................. 144/24.12 |
| 5,360,041 | 11/1994 | Stevens ................................ 144/24.12 |
| 5,363,891 | 11/1994 | Plante ................................... 144/241 |
| 5,435,359 | 7/1995 | Craft ..................................... 144/334 |
| 5,544,984 | 8/1996 | Pantzar ................................. 407/113 |
| 5,623,979 | 4/1997 | Bowling ............................... 144/241 |
| 5,655,581 | 8/1997 | Craft ..................................... 144/24.12 |
| 5,660,217 | 8/1997 | Nissley ................................. 144/24.12 |
| 5,718,534 | 2/1998 | Neuling ................................... 404/94 |
| 5,743,314 | 4/1998 | Puch ...................................... 144/241 |
| 5,845,689 | 12/1998 | Egging et al. ........................ 144/24.12 |

OTHER PUBLICATIONS

Stump Claw pamphlet, 1990.
Levco Stump & Root Grinders pamphlet, at least as early as Dec. 9, 1997.
Mini Chief advertisement, at least as early as Dec. 9, 1997.
Rayco advertisement, at least as early as Dec. 9, 1997.
Kanga Loaders home page, Sep. 4, 1998.

*Primary Examiner*—W. Donald Bray
*Attorney, Agent, or Firm*—Van Dyke, Gardner, Linn & Burkhart, LLP

[57] ABSTRACT

A grinding apparatus for grinding a stump or the like includes a frame, a rotating member supported by the frame, and a plurality of grinding members mounted to the rotating member. The grinding apparatus further includes a first driver which selectively rotates the rotating member about a drive axis, and a second driver which selectively pivots the rotating member about a vertical pivot axis whereby the rotating member pans between at least a first lateral position and a second lateral position. The grinding apparatus preferably further includes a third driver which selectively pivots the rotating member about a horizontal pivot axis whereby the rotating member moves between at least a first vertical position and a second vertical position. The grinding members each include a plurality of spaced apart distal ends, which define a plurality of cutting tips which provide simultaneous vertical and lateral cutting and grinding actions when the rotating member is rotated about the drive axis and the rotating member is simultaneously moved between the lateral positions and the vertical positions by the second and third drivers.

46 Claims, 7 Drawing Sheets

STUMP GRINDING APPARATUS

TECHNICAL FIELD AND BACKGROUND OF THE INVENTION

The present invention generally relates to a grinding apparatus and, more particularly, to a motorized stump grinding apparatus.

It is often desirable to remove the stump from the ground or to cut or grind the stump to a height that is at least flush or below the surrounding ground surface in order to remove the stump as a potential obstacle to lawn mowers or other similar equipment.

Stump grinding or cutting equipment is used to eliminate a protruding stump of a tree or large bush which has been cut down or fallen over.

Hard operated stump grinding or cutting devices typically include a frame and a plurality of cutting or grinding blades which are mounted to a wheel or a drum which is rotatably mounted to the frame and driven by a motor or the like. As the drum or wheel is rotated, the blades cut into the stump of the tree and gradually grind or cut away the surface of the tree stump until the surface of the tree stump is reduced or lowered to the desired height, preferably below the surface of the ground. Typically, the drum or wheel is rotated to make a first cutting path through the tree trunk, after which the wheel or drum must be raised and then lowered again to make a second cutting path adjacent the first path. This process is repeated until the entire stump is ground down. Therefore, this process can be slow and cumbersome. For large stumps, cutting or grinding wheels or drums have been connected to booms of large caterpillar type tractors and have been powered by powerful hydraulic systems of the large tractors. Like the hand operated units, these units feature cutting and grinding wheels with a plurality of cutting blades, with the wheel or drum typically hydraulically or mechanically operated and powered by internal combustion engines. The large and smaller, hand operated devices each have their own drawbacks. While the hand operated units are more flexible and can be used in more confined spaces than the tractor mounted grinding assemblies, they are hard to control and require greater endurance by the operator. The tractor mounted grinding assemblies can accommodate very large drums which are often as wide as the stump; consequently, they can be very quick. However, the tractor mounted grinding assemblies are bulky and often very costly.

Consequently, there is a need for a stump grinding or cutting apparatus which provides a more efficient cutting and grinding action and which is more compact and easier to use for large and small jobs alike.

SUMMARY OF THE INVENTION

Accordingly, the present invention provides a new and unique grinding assembly, especially suitable for grinding stumps of trees or the like, which includes an improved grinding wheel and grinding members to provide simultaneous vertical and lateral grinding action.

According to one form of the invention, a grinding apparatus includes a frame, a rotating member supported on the frame, and a plurality of grinding members mounted to the rotating member. The grinding apparatus further includes a first driver which selectively rotates the rotating member about a drive access, and a second driver which selectively pivots the rotating member about a vertical pivot axis such that the rotating member pans between at least a first lateral position and a second lateral position. Each of the grinding members includes a first grinding edge and a second grinding edge, with the first grinding edges of at least one group of the grinding members being oriented generally parallel to the drive axis and the second grinding edges of the same group of grinding members being oriented generally orthogonal to the drive axis. In this manner, the grinding members grind an object in a generally horizontal direction when the first driver rotates the rotating member about the drive axis and the second driver pivots the rotating member between the first and second lateral positions.

In another aspect, the grinding apparatus further includes a third driver which pivots the rotating member about a generally horizontal pivot axis between at least a first vertical position and a second vertical position. In this manner, the grinding members grind an object in a generally vertical direction when the rotating member moves between the first and second vertical positions.

In other aspects, the grinding members each include a plurality of spaced apart cutting tips with the grinding edges extending between the cutting tips. Preferably, the grinding edges comprise arcuate grinding edges, for example concave arcuate grinding edges. In other aspects, each of the grinding members includes a concave grinding surface which extends between the grinding edges.

In yet other aspects, the rotating member includes a radiused annular mounting surface. For example, the radiused annular mounting surface may be provided by an annular pipe. Preferably, the grinding members are mounted in an undulating arrangement on the annular pipe.

According to another form of the invention, a grinding wheel for a grinding apparatus includes a rotational member which is adapted for mounting to the grinding apparatus. The grinding wheel further includes a plurality of grinding members which are mounted to an annular arcuate mounting surface of the rotational member. Each of the grinding members includes a first pair of spaced apart grinding edges and a second pair of spaced apart grinding edges, with the second pair of spaced apart grinding edges of a respective grinding member being generally orthogonal to said first grinding edges of the respective grinding member.

In other aspects, each of the grinding members includes a concave grinding surface with portions of the perimeter of the concave grinding surface defining the first pair of spaced apart grinding edges. Other portions of the perimeter of the concave grinding surface define the second pair of spaced apart grinding edges. Preferably, the perimeter of the concave grinding surface is rectangular with a first set of opposed sides of the rectangular perimeter defining the first pair of spaced apart grinding edges, and a second set of opposed sides of the rectangular perimeter defining the second pair of spaced apart grinding edges.

In other aspects, the grinding members are mounted to the annular mounting surface in an undulating arrangement, for example a sinusoidal arrangement.

According to yet another form of the invention, a grinding wheel for a grinding apparatus includes a rotatable member which is adapted for mounting to the grinding apparatus and includes an annular arcuate mounting surface. The grinding wheel further includes a plurality of grinding members mounted to the annular arcuate mounting surface of the rotatable member, with each of the grinding members having a plurality of spaced apart pointed distal ends, with the distal ends defining cutting tips.

In other aspects, each of the grinding members includes a concave grinding surface, with the concave grinding surface extending between the plurality of distal ends. The grinding members each have a first pair of spaced apart grinding edges and a second pair of spaced apart grinding edges, with the grinding edges extending between the plurality of distal ends. Preferably, the grinding edges comprise arcuate grinding edges.

In other aspects, the grinding members are mounted to the annular arcuate mounting surface in an undulating arrangement and define at least an outer array of grinding members and an inner array of grinding members. In further aspects, the grinding members include a central array of grinding members, with the central array of grinding members being positioned between the inner array and outer array of grinding members.

In yet a further form of the invention, a grinding member for a grinding apparatus, which includes a rotatable member and a driver for rotating the rotatable member about a drive axis, includes a body which is adapted to mount to the rotatable member. The body includes a plurality of spaced apart pointed distal ends with the pointed distal ends defining cutting tips.

In preferred aspects, the body includes a concave grinding surface, which extends between the pointed distal ends. In preferred form, the concave grinding surface includes a rectangular perimeter, with a first set of opposed sides of the rectangular perimeter defining a first pair of grinding edges, and a second pair of opposed sides of the rectangular perimeter defining a second set of grinding edges. At least one pair of the grinding edges comprises a pair of generally arcuate grinding edges.

In other aspects, the grinding member has width to height aspect ratio in a range of about 0.5 to 2.0.

As will be understood, the grinding apparatus of the present invention provides numerous advantageous over prior known grinding equipment. The grinding member provides a plurality of cutting edges which permits simultaneous vertical and lateral grinding of an object. Furthermore, the annular mounting surface of the rotatable member positions the grinding members in an arrangement to provide a very effective and efficient cutting path. Consequently, the grinding apparatus of the present invention speeds up the grinding process and, therefore, provides increased efficiency.

These and other objects, advantageous, purposes, and features of the invention will become more apparent from the study of the following description taken in conjunction with the drawings.

DESCRIPTION OF THE PREFERRED EMBODIMENT

Figure 1:
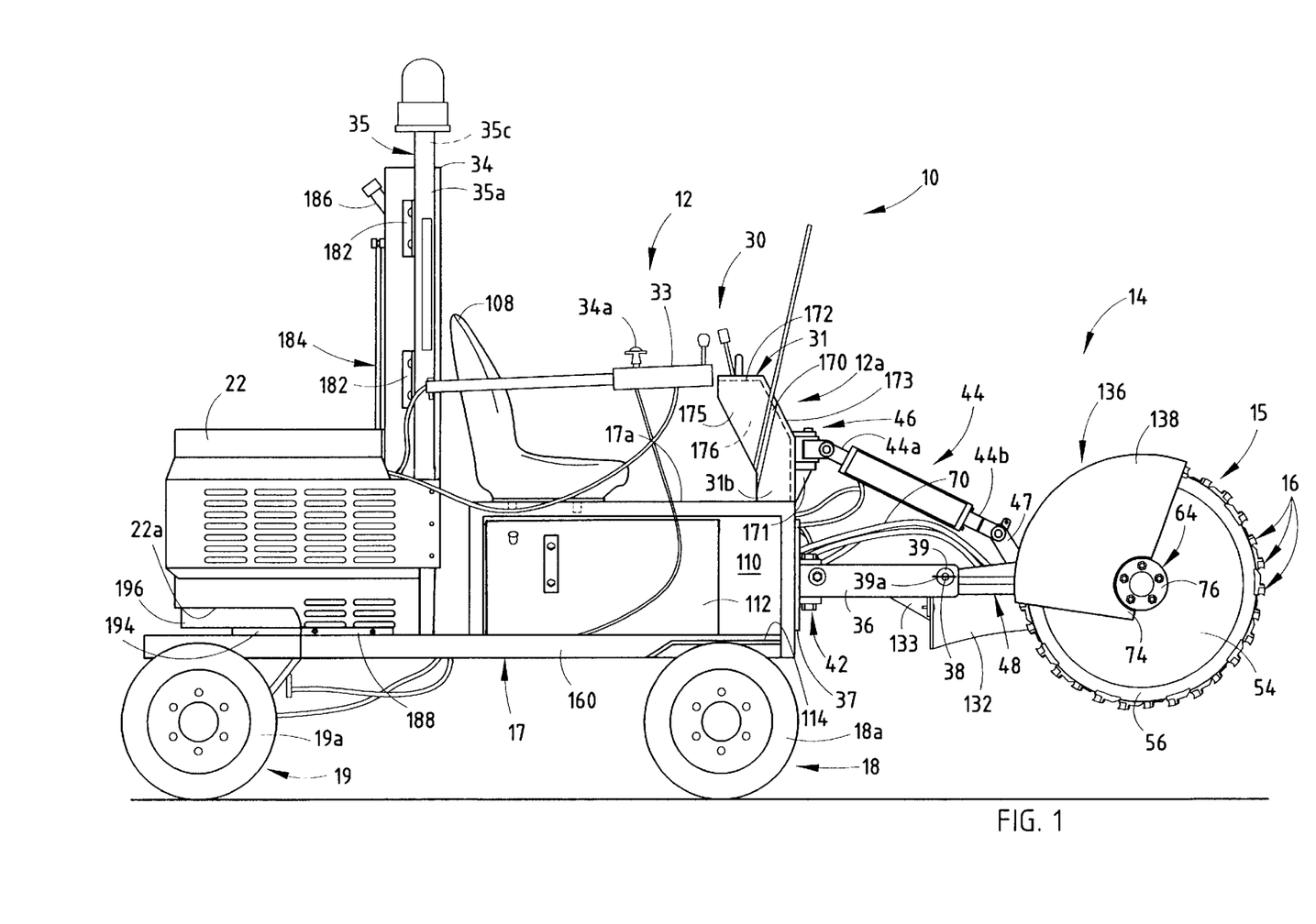
FIG. 1 is a side view of a stump grinding apparatus of the present invention.

Referring to FIG. 1, the numeral 10 generally designates a stump grinding apparatus of the present invention. Stump grinding apparatus 10 includes a motorized vehicle 12 and a grinding assembly 14, which is mounted to the forward end 12a of vehicle 12. Grinding assembly 14 includes a rotating member or wheel 15 and a plurality of grinding member or tooth assemblies 16 which are mounted on wheel 15 in such a manner to provide vertical grinding and lateral grinding simultaneously, which will be described in greater detail below.

Figure 3:
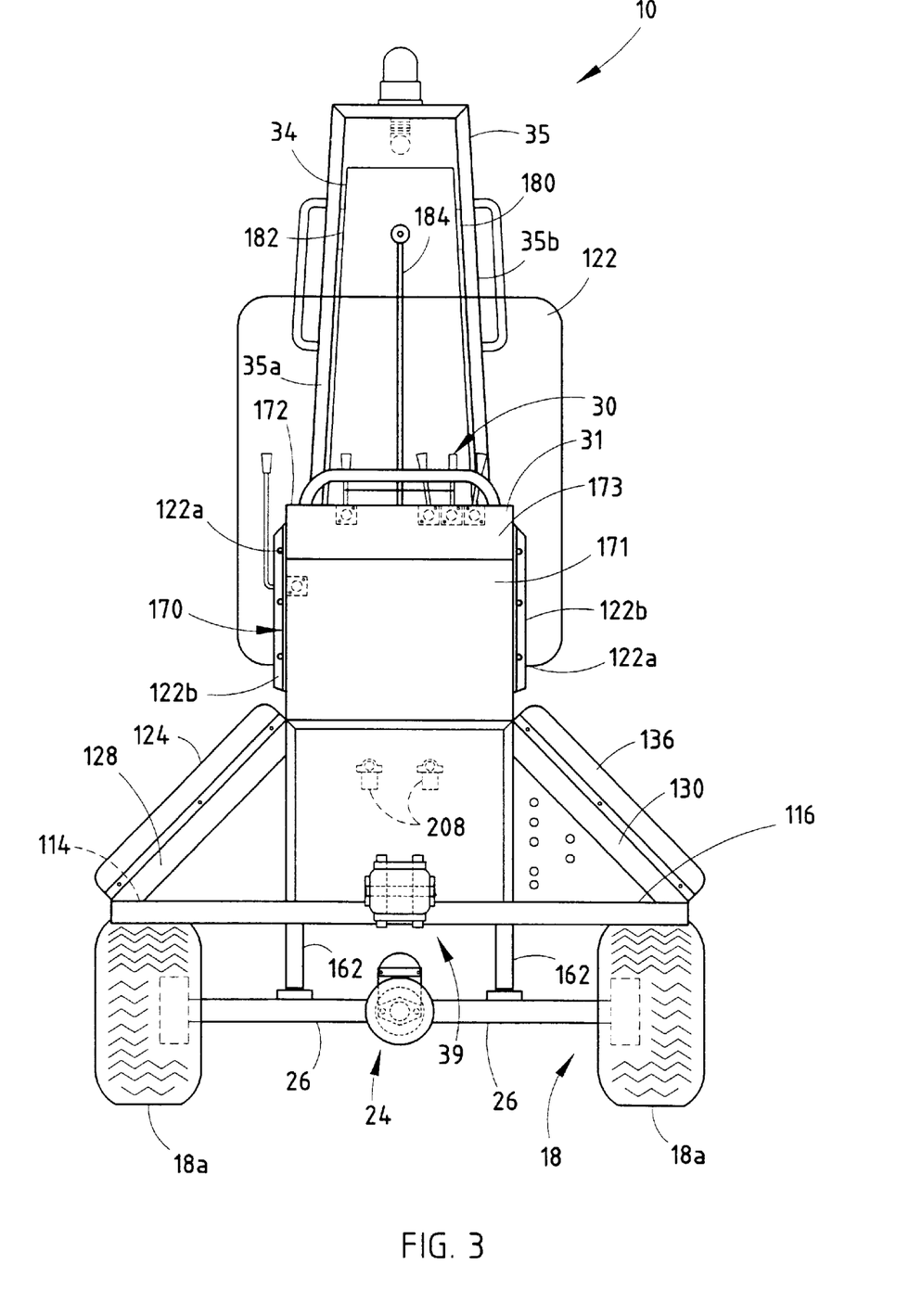
FIG. 3 is a front view of the stump grinding apparatus of FIG. 1 with the grinding assembly removed.

Vehicle 12 is preferably motorized by a conventional engine 20 which is supported on vehicle frame 17 and is housed in an engine compartment 22. Frame 17 is mounted on a pair of wheel axles 18 and 19 which respectively include wheel assemblies 18a and 19a. Wheel axle 18 is preferably a drive axle and driven, for example, by a hydraulic motor 24 which is coupled to and controlled by hydraulic controls 30 mounted on vehicle console 31. Hydraulic motor 24 is mounted to the underside of frame 17 and drivingly coupled, for example by a drive coupler, to a shaft 26 of wheel drive axle 18 (FIG. 3). Wheel axle 19 preferably includes a steering cylinder 28 which is similarly coupled to and controlled by hydraulic controls 30. Hydraulic fluid is delivered to controls 30 by a hydraulic pump 20a, which is powered by engine 20. Engine 20 is preferably a gas powered engine which runs on fuel supplied from fuel reservoir 34. The power output of engine 20 is controlled by a foot pedal 34b or a throttle 34a which is supported on a second control panel 33 and coupled to fuel reservoir 34. In the illustrated embodiment, fuel reservoir 34 is supported by vertical frame member 35 which is positioned behind the operator and above deck 17a of frame 17. However, it should be understood that fuel reservoir 34 can be located in other positions on frame 17 as would be understood by those skilled in the art.

Figure 5:
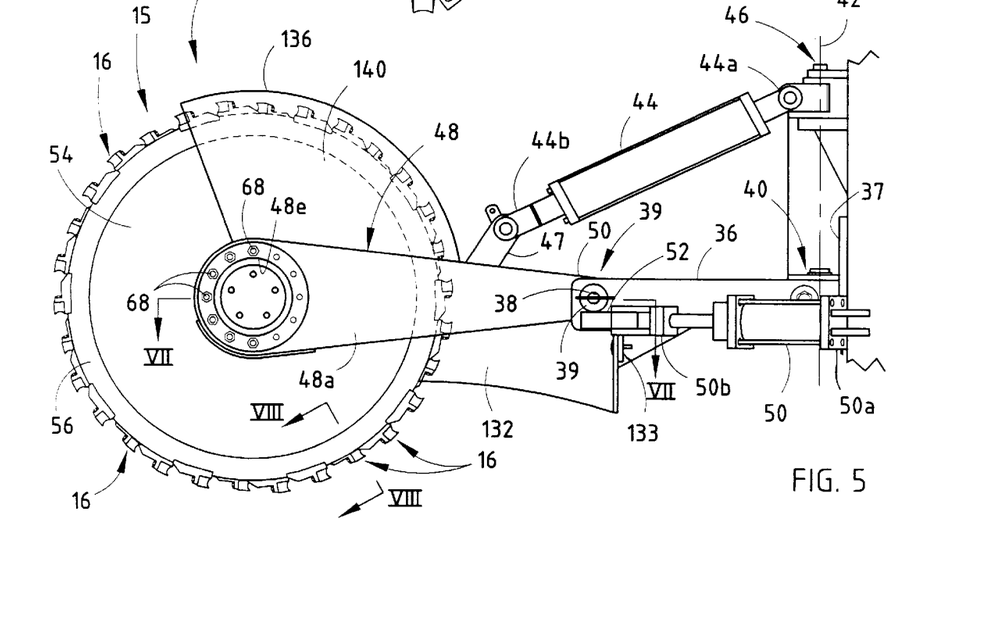
FIG. 5 is a side view of the grinding assembly and grinding assembly mounting arrangement.
Figure 6:
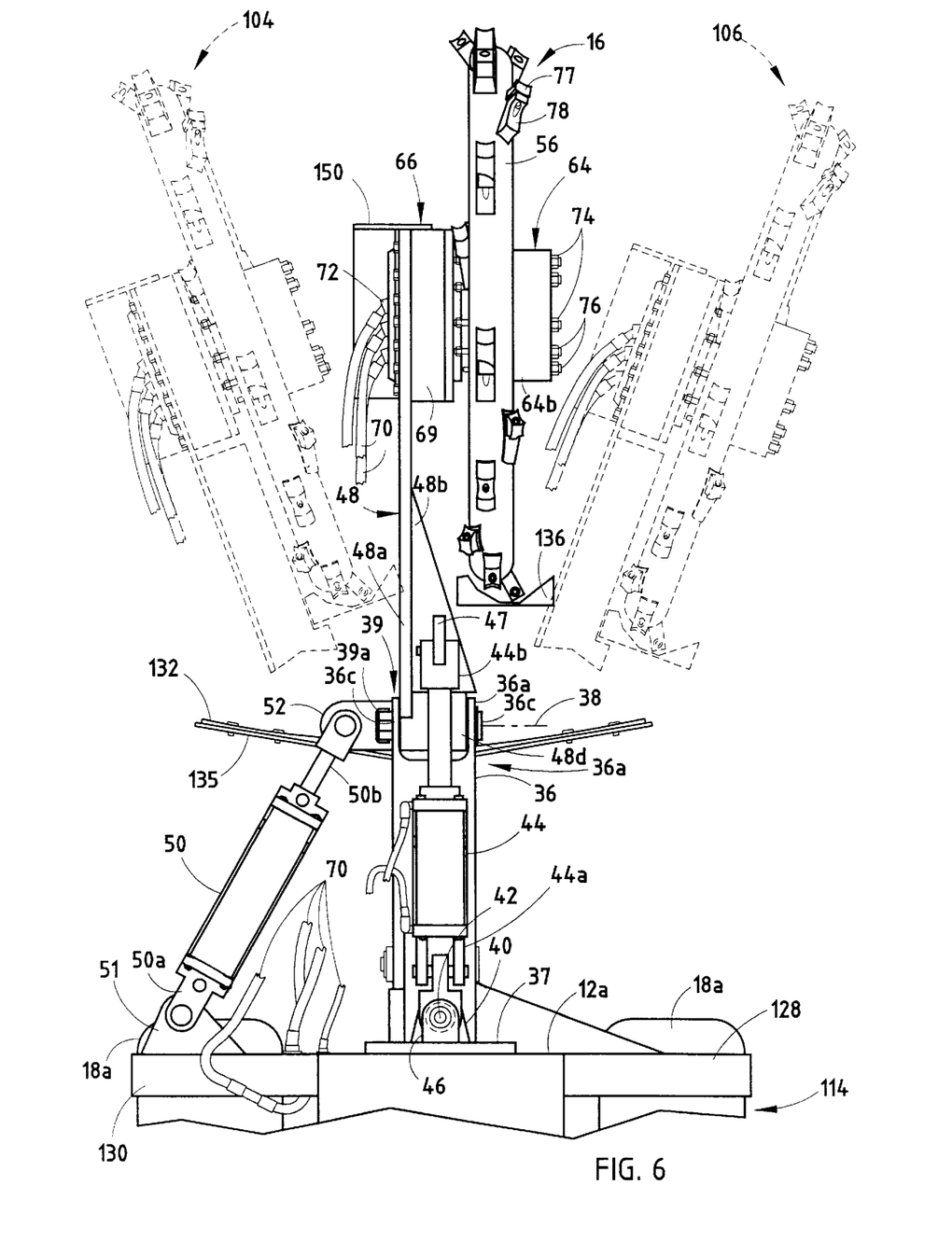
FIG. 6 is a fragmentary plan view of the grinding assembly illustrating the pivotal movement of the grinding assembly about the frame of the grinding apparatus.

As described above, grinding assembly 14 is mounted to forward end 12a of vehicle 12. Referring to FIG. 5, grinding assembly 14 is supported by a support member or boom 36 which in turn is mounted to frame 17 by support plate 37, which provides a rigid mounting surface. Preferably, grinding assembly 14 is pivotally mounted to a first end 36a of support member 36 by a pivot joint 39 on a pivot pin 39a which permits pivotal movement of grinding assembly 14 about a horizontal axis of rotation 38 (FIG. 6). In this manner, grinding assembly 14 moves in the vertical direction when grinding assembly 14 is pivoted about axis 38. Support member or boom 36 is pivotally mounted to support plate 37 by pivot joint 40 which permits pivotal movement of support member 36 and grinding assembly 14 about a vertical pivot axis 42 and permits grinding assembly 14 to move or pan in a horizontal direction or plane. In this manner, grinding assembly 14 is pivotally mounted to vehicle 12 to permit simultaneous pivoting about vertical pivot axis 38 and horizontal pivot axis 42.

Figure 2:
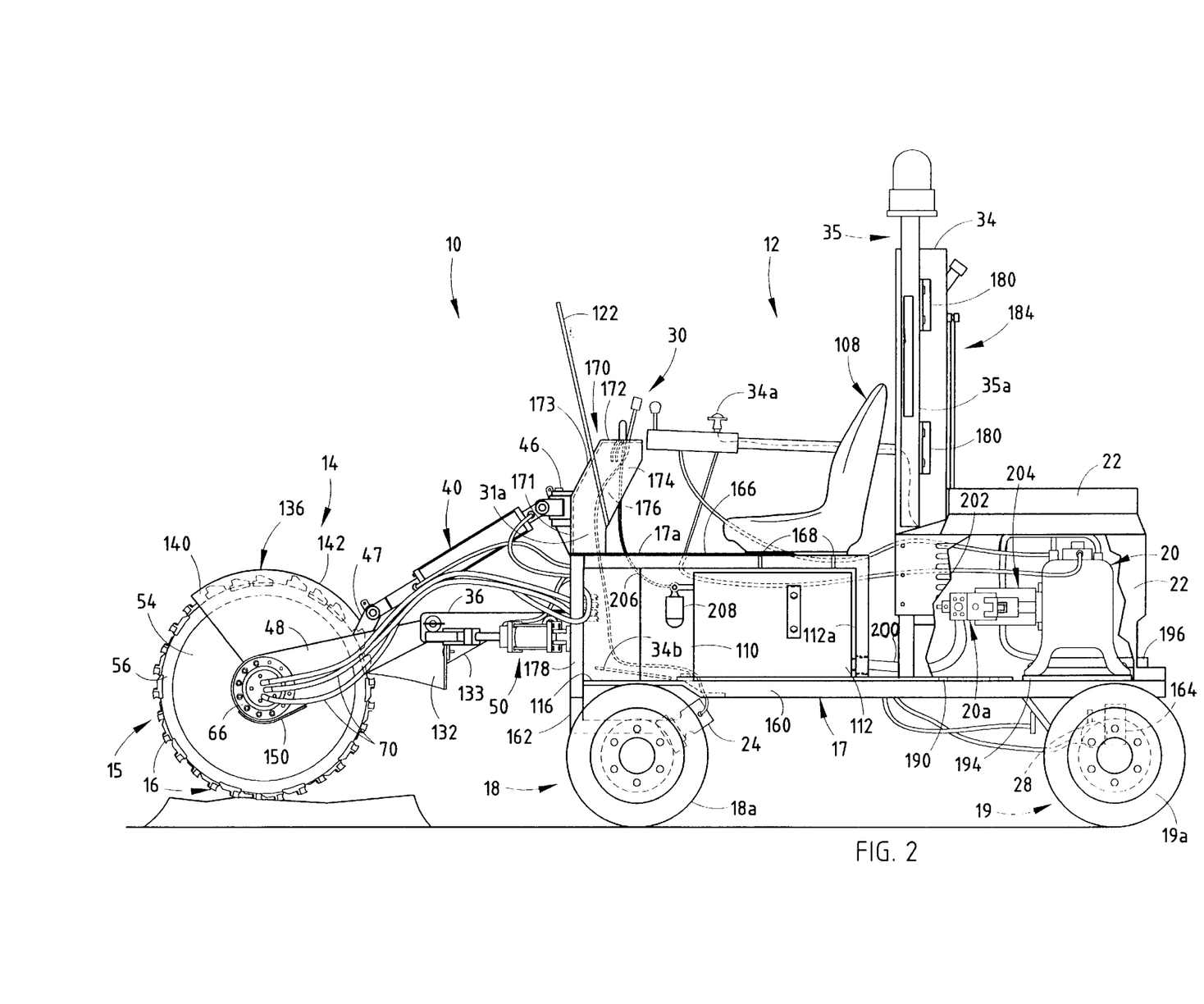
FIG. 2 is a second side partial fragmentary view of the stump grinding apparatus of FIG. 1 illustrating a stump grinding assembly of the grinding apparatus lowered in a grinding position for grinding a stump.

As best seen in FIGS. 1 and 2, the position of grinding assembly 14 is controlled by one or more drivers, such as cylinders. Preferably, grinding apparatus 10 includes a first pivot cylinder 44 which is pivotally mounted at one end 44a to frame 17 by mounting bracket 46 and pivotally mounted at a second or rod end 44b to a mounting bracket 47, which is secured to an arm 48 of grinding assembly 14. When pivot cylinder 44 is extended or contracted, therefore, grinding assembly 14 moves in the vertical direction. In addition, grinding apparatus 10 includes a second pivot cylinder 50 which is pivotally mounted on one end 50a to frame 17 by mounting bracket 51 and pivotally mounted on second or rod end 50b to a first end 36a of support member 36 by mounting bracket 52 (FIG. 6). In this manner, when pivot cylinder 50 is extended or contracted, grinding assembly 14 moves or pans in a horizontal or lateral direction. Preferably, pivot cylinders 44 and 50 comprise hydraulic cylinders; however, it should be understood that other cylinders or drivers including, for example pneumatic cylinders or servo devices, may be used to move grinding assembly 14 in the vertical and lateral directions.

Figure 7:
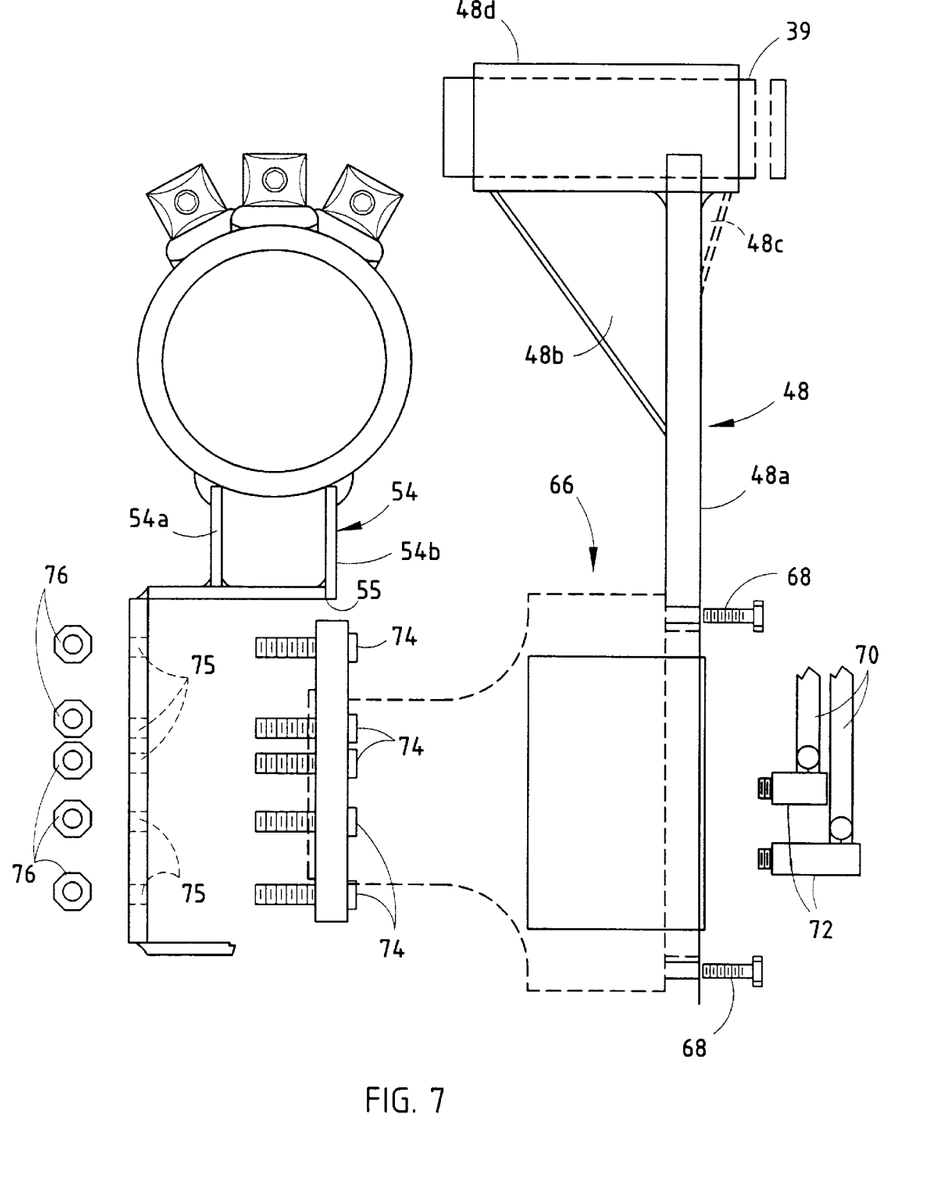
FIG. 7 is a partial cross-sectional view taken along line VII—VII of FIG. 5.

As best seen in FIGS. 6 and 7, arm 48 of grinding assembly 14 includes a plate member 48a which is reinforced by one or more stiffener plates 48b and 48c. Welded or otherwise rigidly secured to one end of plate 48a is a bushing 48d which forms pivot joint 39. Arm 48 is pivotally coupled to support member 36 by bushing 48d which is aligned between two spaced apart bracket ears 36b and 36c of support member 36 and pivotally coupled thereto by pin 39a which extends through respective openings provided in ears 36b and 36c and through bushing 48d. Preferably, mounting bracket 47 is welded or otherwise rigidly secured to stiffener plate 48b so that when cylinder 44 contracts or expands, arm 48 pivots about pivot joint 39.

Figure 8:
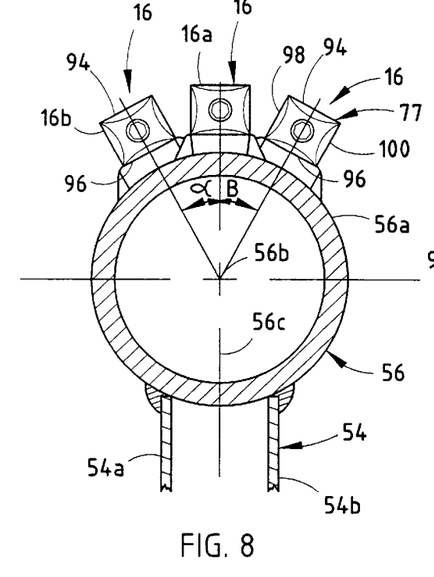
FIG. 8 is a cross-sectional view taken along line VIII—VIII of FIG. 5.

Referring again to FIGS. 5 and 6, wheel 15 comprises a disc member 54 and an annular mounting member 56 which provides an arcuate mounting surface 56a on which grinding tooth assemblies 16 are mounted. Preferably annular mounting member 56 comprises a member with a radiused cross-section, for example a pipe, and is rigidly secured to the outer perimeter of disc member 54, for example, by welding. Disc member 54 may comprise a single plate member or, as illustrated in the present embodiment, may comprise a pair of spaced apart circular plate members 54a and 54b (FIGS. 7 and 8). A central portion 64 of disc member 54 is offset and includes a center circular plate member 64a and an annular wall 64b which is welded to the perimeter of center circular plate member 64a on one side and welded to plate members 54a and 54b on the other side (FIGS. 1 and 7). It should be understood that disc member 54 and central portion 64 can be formed from a single plate member. Disc member 54 is rotatably mounted on arm 48 about drive axis 54a and driven by a wheel drive motor 66, preferably a hydraulic motor. Motor 66 is mounted to arm 48 by a plurality of mounting bolts which extend through plate member 48a of arm 48 and through motor casing 69. Motor 66 is seated in an opening 48e of arm 48 and is coupled to hydraulic controls 30 via hoses 70, which are connected to motor 66 by conventional couplers 72. Motor 66 includes drive bolts 74 which project through respective openings 75 provided in plate member 64a of disc member 54 and are coupled and secured to plate member 64a by retaining bolts 76 (FIGS. 1 and 7). In this manner, when hydraulic motor 66 is powered by engine 20, wheel 15 is driven and rotates about axis 15a.

Figure 4:
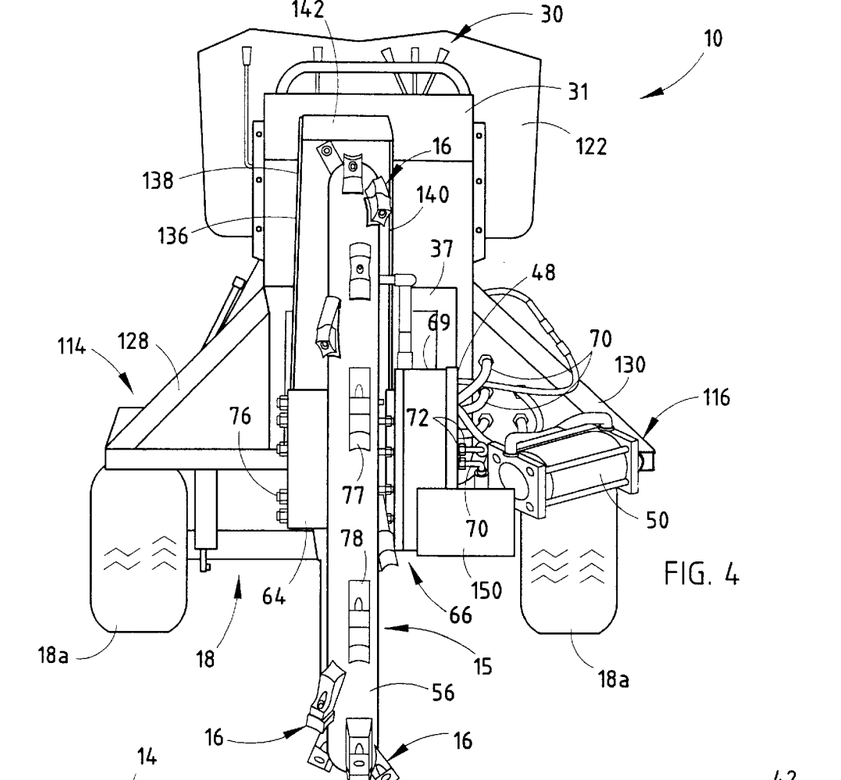
FIG. 4 is an enlarged fragmentary front view of the stump grinding apparatus of FIG. 1.

Referring to FIG. 4, grinding tooth assemblies 16 are preferably mounted to arcuate surface 56a of annular member 56 in an undulating pattern, for example a generally sinusoidal pattern. Grinding tooth assemblies 16 are rigidly secured to annular member 56, for example by welding. Each grinding tooth assembly 16 is circumferentially spaced around annular member 56 and mounted to annular member 56 in a generally orthogonal orientation to annular surface 56a such that each respective grinding tooth assembly 16 aligns along a radius which extends through center 56b of annular member 56 (FIG. 8).

Figure 9:
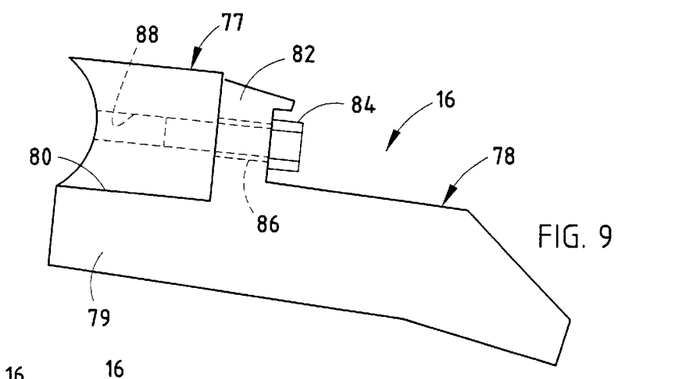
FIG. 9 is an enlarged side view of a grinding tooth assembly.

Referring to FIG. 9, each grinding tooth assembly 16 includes a grinding member or tooth 77 and a mounting member 78. Mounting member 78 includes a base 79 which defines a seat 80 for receiving tooth 77 and a mounting flange 82 to which grinding tooth 77 is preferably removably mounted by, for example, a bolt 84. Bolt 84 extends through an opening 86 provided in flange 82 and into a corresponding threaded opening 88 provided in tooth 77. In this manner, when grinding teeth 77 are worn, they can be easily removed for replacement. Each grinding tooth assembly 16 is preferably secured to annular member 56 by welding base 79 to annular surface 56a. In order to provide a close fit-up, base 79 may be ground, formed, or cut in a manner to generally follow the surface of annular member 56.

Figure 10:
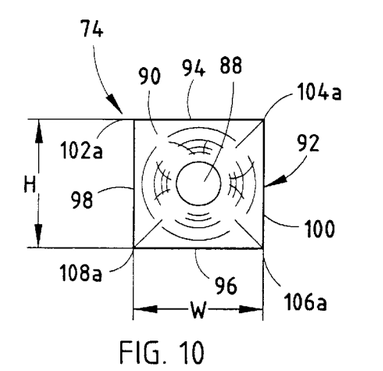
FIG. 10 is a front elevation view of the grinding tooth assembly of FIG. 9.
Figure 11:
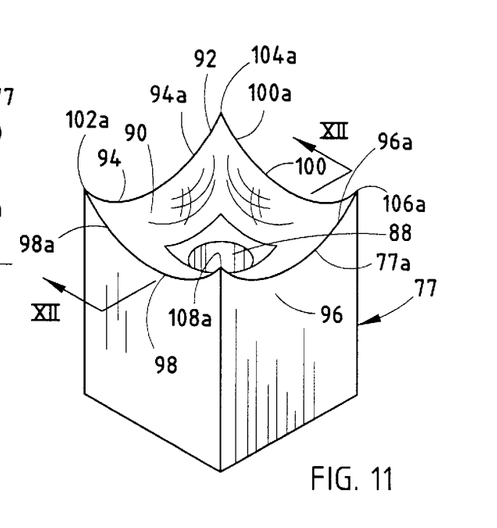
FIG. 11 is a perspective view of a grinding tooth of the grinding tooth assembly of FIG. 9.
Figure 12:
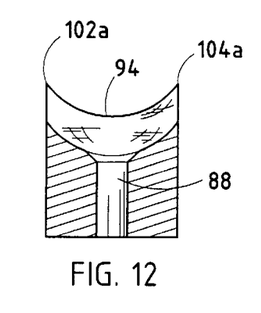
FIG. 12 is a cross-sectional view taken along line XII—XII of FIG. 11.
Figure 13:
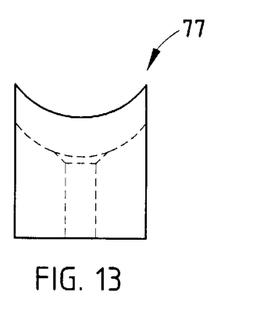
FIG. 13 is a side view of the grinding tooth of FIG. 11.

Referring to FIGS. 10–13, grinding tooth 77 comprises a block of metal, for example hardened steel or the like, with a concave grinding surface 90 at its distal end portion 77a. Concave grinding surface 90 is preferably a spherical concave grinding surface and includes a rectangular perimeter 92. Rectangular perimeter 92 includes a first set of opposed sides 94 and 96 which respectively define a pair of spaced apart grinding or cutting edges 94a and 96a and, further, includes a second pair of opposed sides 98 and 100 which respectively define a pair of space apart grinding or cutting edges 98a and 100a. In preferred form, sides 94, 96, 98, and 100 have a width to height ratio in a range of about 0.5 to 2.0 with the width and height as used in the specification being denoted by W and H, respectively (FIG. 10). As best seen in FIG. 10, grinding edges 94a and 96a are generally orthogonal to grinding edges 98a and 100a. The junctures of grinding edges 94a, 96a, 98a, and 100a define spaced apart pointed distal ends 102a, 104a, 106a, and 108a which provide cutting tips for the respective tooth 77. Referring to FIG. 8, when grinding tooth assemblies 16 are mounted to annular member 56, grinding edges 94a and 96a are generally tangential to arcuate surface 56a. Preferably wheel 15 includes a centrally disposed array of grinding tooth assemblies 16a each of which have grinding edges 94a and 96a generally parallel with drive axis 15a. Furthermore, grinding edges 98a and 100a of centrally positioned tooth assemblies 16a are generally orthogonal to drive axis 15a and generally parallel to central axis 56c of annular member 56.

Referring again to FIG. 8, grinding assembly 14 also preferably includes outer and inner arrays or sets of grinding tooth assemblies 16b and 16c which are each offset by arcuate angles α and β in a range of about 10 degrees to 30 degrees from central axis 56a extending over an arcuate portion of annular member 56 in a range of about 20 degrees to 60 degrees. In preferred form, grinding tooth assemblies 16b and 16c are offset at an angle in a range of about 10 degrees to 20 degrees from central axis 56c extending over an arcuate portion of annular member 56 of about 20 to 40 degrees. In most preferred form, angle a is in a range of about 12 degrees to 15 degrees, and angle β is in a range of about 10 degrees to 15 degrees. When wheel 15 is rotated about axis 15a, grinding tooth assemblies 16 define a toroidal cutting path and, further, provide vertical cutting as well as lateral cutting capability when grinding assembly 14 is rotated about axis 15a and pivoted about axes 38 and 42 by the contractions or extensions of cylinders 44 and 50. For example, as best seen in FIG. 6, the contraction or extension of cylinder 50 moves grinding assembly 14 between at least a first lateral position 104 (shown in phantom) and a second lateral position 106 (shown in phantom). When both cylinders are actuated, grinding assembly 14 provides simultaneous vertical and horizontal grinding which provides an effective and quick grinding action that reduces the stump of a tree or the like in a very efficient manner heretofore unknown.

Referring again to FIGS. 1 and 2, vehicle 12 includes a seat 108 for an operator. Seat 108 is supported on deck 17a of frame 17 rearward of grinding assembly 14. Defined beneath deck 17a is a compartment 110 which houses a hydraulic reservoir tank 112, which supplies hydraulic fluid to hydraulic motor 24 and to hydraulic motor 66. However, it should be understood that hydraulic reservoir tank 112 may be located and supported in numerous other positions on frame 17. Preferably, frame 17 includes a pair of foot rests 114 and 116 which project outwardly from frame 17 and extend over the respective wheel assemblies 18a of wheel axle 18. Foot rests 114 and 116 may provide fenders for wheel assemblies 18a. Positioned on foot rest 116 is foot speed control 34b, which is coupled to foot rest 114 and control 30 to control the speed of apparatus 10. Console 31 is mounted and projects upwardly from deck 17a and is positioned for easy access by the operator of apparatus 10.

Console 31 provides at least a partial protective barrier for the operator of apparatus 10 from the debris which is generated by the grinding action of grinding assembly 14. To provide further protection, mounted to opposed sides 31a and 31b of console 31 is a shield 122, for example a Lexan shield, which extends upwardly and outwardly from console 31 to provide additional protection for the operator of apparatus 10. Shield 122 is mounted, for example by fasteners 122a to a mounting flange 122b provided on console 31. It should be understood that shield 122 can be mounted using other suitable arrangements as would be understood by those skilled in the art. Additional leg shields or guards 124 and 126 may be respectively mounted to brace frame members 128 and 130 of frame 17.

To reduce the amount of debris projected toward the vehicle 12, grinding wheel assembly preferably includes a wheel shield 136 which extends over wheel 15. Shield 136 extends around the circumference of wheel 15 in a range of approximately 90 degrees to 180 degrees. Shield 136 includes opposed side walls 138 and 140 which are interconnected by an arcuate plate member 142 which is preferably welded or otherwise rigidly secured to side walls 136 and 138. Side wall 140 is mounted to motor casing 69 by motor mounting bolts 68. It should be understood, however, that other arrangements may be used to mount wheel guard 136 to grinding assembly 14. Additionally, grinding assembly 14 may include a shield 132 which is secured by a mounting bracket 133 to support member 36 and extends below arm 48 close to ground level and, further, wraps around wheel 15. As best seen in FIGS. 2 and 6, grinding assembly 14 may further include a protective guard 150 which is welded to the distal end of arm 48 and provides a protective barrier for the hose connections to motor 66. From the foregoing, it should be understood that when debris is generated by the grinding and cutting action of grinding assembly 14, the debris is directed by wheel shield 136 forward of grinding apparatus 10. However, for the remaining debris which is not trapped and directed by shield 136, protective guard 132 and shields 122, 124, and 126 will significantly reduce the amount of debris that could potentially contact the operator of the vehicle.

In the illustrated embodiment, frame 17 includes a base frame member 160 which includes downwardly depending front frame supports 162 and downwardly depending rear frame supports 164. Frame supports 162 are mounted to shaft 26 of front axle 18, whereas support members 164 are supported on rear wheel axle 19. Projecting upwardly from base frame member 160 is deck 17a. Seat 108 is preferably secured to an upper member 166 of deck 17a above compartment 110, for example by conventional fastening hardware 168, such as bolts, rivets, or the like. Console 31 is mounted to upper member 166 of deck 17a forward of seat 108 for easy access by the operator and is preferably secured thereto by welding. As best seen in FIGS. 1 and 2, console 31 includes a front facing plate member 170 which includes a first portion 171 which is generally vertical and a second portion 172 which is generally horizontal and which provides a mounting surface for controls 30. First and second portions 171 and 172 are interconnected by a transition or angled member 173. Console 31 further includes side plate members 174 and 175 which are preferably welded or otherwise rigidly secured to the side edges of front facing plate member 170 to form an enclosure for the valves of hydraulic controls 30 and hoses 70.

As best seen in FIG. 2, hoses 70 extend from controls 30 through enclosure 176 and through upper member 166 of deck 17a into compartment 110. The hoses that deliver hydraulic fluid to motor 66 and cylinders 44 and 50 extend through a front wall 178 compartment 110 for coupling to the respective cylinders 44 and 50 and hydraulic motor 66. The hydraulic hoses for delivering hydraulic fluid to motor 24 and steering cylinder 28, extend from compartment 110 and through base frame 160 for coupling to drive motor 24 and steering cylinder 28.

Referring to FIGS. 1 and 2, projecting upwardly from base frame member 160 is vertical frame member 35. Vertical frame member 35 includes two spaced apart column members 35a and 35b which are interconnected at their upper ends by a transverse member 35c and anchored, for example by welding, at their lower ends to base frame 160 rearward of seat 108. Reservoir 34 is secured to the respective column members 35a and 35b by mounting brackets 180 and 182 and is positioned forward of engine 20. Reservoir 34 includes a fill port 186, which preferably faces rearward, and optionally, includes a sight gage 184 which provides a quick indication of the level of fuel in reservoir 34. Mounted to the rearward portion of base frame member 160 and to column members 35a and 35b of vertical frame 35 is engine compartment 22. Engine compartment 22 is formed from sheet metal members which are riveted or otherwise secured to column members 35a and 35b and to respective mounting flanges 188 and 190 provided on base frame member 160 (FIGS. 1 and 2). Preferably, compartment 22 is secured to vertical members 35a and 35b and mounting flanges 188 and 190 by conventional fastening hardware such as screws, bolts, rivets, or the like.

As best seen in FIG. 2, engine 20 is mounted to an engine support plate 194 by conventional anchor bolts which in turn is mounted, for example by welding, to base frame member 160. Engine 20 includes an exhaust pipe 196 which extends through an opening 22a formed in compartment 22. Also housed in compartment 22 is hydraulic pump 20a. Pump 20a includes a pump inlet line 200, which is coupled to an outlet 112a of hydraulic reservoir 112 and a pump pressure line 202 which delivers hydraulic fluid to hydraulic controls 30. In the illustrated embodiment, pump 20a is supported by an engine pump mount 204 which mounts on to engine 20; however, it should be understood that other mounting arrangements are contemplated as would be understood by those skilled in the art.

In operation, engine 20 powers hydraulic pump 20a which delivers hydraulic fluid under pressure to hydraulic controls 30. Hydraulic controls 30 in turn, control the pressure of the hydraulic fluid which is delivered to motor 24 and motor 66 in order to control the speed of vehicle 12 and the speed of rotation of wheel 15, respectively. Controls 30 further control the flow of hydraulic fluid to steering cylinder 28. It should be understood from the foregoing that hydraulic fluid flows from reservoir 112 to pump 20a through pump inlet 200 and from pump 20a through pressure line 202 to hydraulic controls 30. The hydraulic fluid is then returned to reservoir 112 via return line 206 and, preferably, through hydraulic return filters 208.

Although one form of the invention has been shown and described, other forms will now be apparent to those skilled in the art. For instance, while the description of preferred embodiments has described a hydraulically driven vehicle and hydraulically steered vehicle, it should be understood that other drive mechanisms and steering mechanisms may be used. In addition, while grinding assembly 14 is described as being driven by a hydraulic motor, other drive mechanisms may be used, for example a conventional sprocket and chain assembly which is coupled to a shaft of a motor, including for example an electric motor or the like. In a similar manner, drivers 44 and 50 may comprise pneumatic cylinders or servo-drive mechanisms or the like. Moreover, frame 17 of vehicle 12 may assume numerous configurations and may be constructed from any number of structural members including for example channel members, angle members, pipes, tubular members, structural plates, or the like, which may be welded together or secured together by conventional fastening hardware, including rivets or bolts. The embodiments of the invention shown in the drawings is not intended to limit the scope of the invention which is defined by the claims which follow.

The embodiments of the invention in which an exclusive property or privilege is claimed are defined as follows:

1. A grinding apparatus comprising:
    a frame;
    a rotating member supported by said frame, said rotating member being pivotally mounted to said frame about a generally vertical pivot axis and a generally horizontal pivot axis and including a radiused mounting surface;
    a first driver selectively rotating said rotating member about a drive axis;
    a second driver selectively pivoting said rotating member about said vertical pivot axis whereby said rotating member pans between at least a first lateral position and a second lateral position;
    a third driver selectively pivoting said support member about said generally horizontal pivot axis between at least a first vertical position and a second vertical position; and
    a plurality of grinding members mounted and secured to said radiused mounting surface of said rotating member, each of said grinding members having a plurality of spaced apart cutting tips and a first pair of opposed arcuate grinding edges and a second pair of opposed arcuate grinding edges, said grinding edges extending between said cutting tips, said first grinding edges of at least one group of said grinding members being oriented generally parallel to said drive axis, said second grinding edges of said one group being oriented generally orthogonal to said drive axis, said grinding members simultaneously grinding an object in a generally horizontal direction and vertical direction when said first driver rotates said rotating member about said drive axis, said second driver pivots said rotating member about said vertical pivot axis, and when said third driver pivots said rotating member about said horizontal pivot axis.

2. The grinding apparatus according to claim 1, wherein said grinding edges comprise concave arcuate grinding edges.

3. The grinding apparatus according to claim 1, wherein each of said grinding members includes a concave grinding surface, said concave grinding surface extending between grinding edges.

4. The grinding apparatus according to claim 1, wherein said rotating member includes a radiused annular mounting surface.

5. The grinding apparatus according to claim 4, wherein said rotating member includes an annular pipe, said annular pipe defining said radiused annular mounting surface.

6. The grinding apparatus according to claim 5, wherein said grinding members are mounted in an undulating arrangement on said annular pipe.

7. The grinding apparatus according to claim 1, wherein each of said grinding members is mounted to said rotating member by a mounting member, each of said grinding members being removably mounted to its respective mounting member.

8. The grinding apparatus according to claim 1, wherein said first driver comprises a hydraulic motor.

9. The grinding apparatus according to claim 1, wherein said second driver comprises a cylinder.

10. The grinding apparatus according to claim 1, wherein each of said grinding members includes a planar mounting surface opposed from said grinding edges and cutting tips for mounting said grinding members to said rotating member.

11. The grinding apparatus according to claim 1, wherein each of said grinding members comprises a block member, each of said block members including a generally planar mounting surface for securing said grinding members to said rotating member, and each of said block members further including projecting pointed distal ends defining said spaced apart cutting tips.

12. A grinding apparatus comprising:
    a frame;
    a rotating member supported by said frame, said rotating member pivotally mounted to said frame about a generally vertical pivot axis and about a generally horizontal pivot axis, and said rotating member including an annular radiused mounting surface;
    a first driver selectively rotating said rotating member about a drive axis;
    a second driver selectively pivoting said rotating member about said vertical pivot axis whereby said rotating member pans between at least a first lateral position and a second lateral position;
    a third driver selectively pivoting said rotating member about said horizontal pivot axis whereby said rotating member moves between at least a first vertical position and a second vertical position; and
    a plurality of grinding members mounted to said radiused mounting surface, each of said grinding members having a plurality of spaced apart pointed distal ends and a planar mounting surface opposed from said pointed distal ends for mounting on said rotating member, said spaced apart pointed distal ends defining a plurality of cutting tips, and said grinding members simultaneously cutting in generally vertical planes and horizontal planes when said rotating member is rotated by said first driver about said drive axis and moved about said generally vertical and horizontal pivot axes by said second and third drivers.

13. The grinding apparatus according to claim 12, wherein said grinding members each include a plurality of grinding edges, said grinding edges extending between said cutting tips.

14. The grinding apparatus according to claim 13, wherein said grinding edges comprise arcuate grinding edges.

15. The grinding apparatus according to claim 12, wherein each of said grinding members includes a concave grinding surface, said concave grinding surface extending between said plurality of cutting tips.

16. The grinding apparatus according to claim 1, wherein said grinding members include a central undulating array of grinding members.

17. The grinding apparatus according to claim 16, wherein said central array of grinding members are generally aligned along a radial axis extending through said drive axis.

18. The grinding apparatus according to claim 1, wherein said grinding members define a toroidal cutting surface.

19. A grinding apparatus having a grinding wheel, said grinding wheel comprising:
  a rotational member, said rotational member being adapted for mounting to the grinding apparatus, said rotational member including an annular arcuate mounting surface and being adapted to be driven about a drive axis and moved about generally horizontal and vertical pivot axes; and
  a plurality of grinding members mounted to said annular arcuate mounting surface, each of said grinding members having a plurality of distal cutting tips and a first pair of opposed spaced apart arcuate grinding edges and a second pair of opposed spaced apart arcuate grinding edges disposed between said cutting tips, said second pair of spaced apart grinding edges of a respective grinding member being generally orthogonal to said first grinding edges of said respective grinding member, and said grinding members for simultaneously cutting in generally horizontal and vertical planes when said rotatable member is driven about said drive axis and moved about said pivot axes.

20. The grinding apparatus according to claim 19, further comprising a mounting member for each respective grinding member, said mounting members being rigidly secured to said annular arcuate mounting surface.

21. The grinding apparatus according to claim 20, wherein said grinding members are removably mounted to their respective grinding member mounts.

22. The grinding apparatus according to claim 19, wherein each of said grinding members includes a concave grinding surface, said concave grinding surface having a perimeter, and portions of said perimeter of said concave grinding surface defining said first pair of spaced apart grinding edges.

23. The grinding apparatus according to claim 22, wherein other portions of said perimeter of said concave grinding surface define said second pair of spaced apart grinding edges.

24. The grinding apparatus according to claim 23, wherein said perimeter comprises a rectangular perimeter, a first set of opposed sides of said rectangular perimeter defining said first pair of spaced apart grinding edges, and a second set of opposed sides of said rectangular perimeter defining said second pair of spaced apart grinding edges.

25. The grinding apparatus according to claim 19, wherein said plurality of grinding members are mounted to said annular mounting surface in an undulating arrangement.

26. The grinding apparatus according to claim 13, wherein said undulating arrangement comprises a sinusoidal arrangement.

27. The grinding apparatus according to claim 19, wherein said mounting members are welded to said annular arcuate mounting surface of said rotating member.

28. The grinding apparatus according to claim 19, wherein said rotating member includes an annular pipe, said annular pipe defining said annular arcuate mounting surface.

29. The grinding apparatus according to claim 28, wherein said grinding members are mounted over an arcuate portion of said annular pipe, said arcuate portion having a range of about 20 degrees to 120 degrees.

30. The grinding apparatus according to claim 29, wherein said arcuate portion has an angle of about 60 degrees.

31. The grinding apparatus according to claim 28, wherein said grinding members are mounted to said pipe generally orthogonal to said arcuate mounting surface.

32. The grinding apparatus according to claim 19, wherein each of said grinding teeth have a width to height aspect ratio in a range of about 0.5 to 2.0.

33. A grinding apparatus having a grinding wheel, said grinding wheel comprising:
  a rotatable member being adapted for mounting to the grinding apparatus, said rotatable member including an annular arcuate mounting surface and being adapted to be driven about a drive axis and moved about generally horizontal and vertical pivot axes; and
  a plurality of grinding members mounted to said annular arcuate mounting surface, each of said grinding members having a plurality of spaced apart pointed distal ends and a planar mounting surface opposed from said pointed distal ends for mounting to said rotatable member, and said cutting tips for simultaneously cutting in generally horizontal and vertical planes when said rotatable member is driven about said drive axis and moved about said pivot axes.

34. The grinding apparatus according to claim 33, wherein each of said grinding members includes a concave grinding surface, said concave grinding surface extending between said plurality of distal ends.

35. The grinding apparatus according to claim 33, wherein said grinding members each have a first pair of spaced apart grinding edges and a second pair spaced apart grinding edges, said grinding edges extending between said plurality of distal ends.

36. The grinding apparatus according to claim 35, wherein said grinding edges comprise arcuate grinding edges.

37. The grinding apparatus according to claim 33, wherein said support member includes an annular pipe, said annular pipe defining said annular arcuate mounting surface.

38. The grinding apparatus according to claim 33, wherein said plurality of grinding members are circumferentially spaced around said annular pipe member.

39. The grinding apparatus according to claim 38, wherein said plurality of grinding members are mounted to said annular arcuate mounting surface in an undulating arrangement and define at least an outer array of grinding members and an inner array of grinding members.

40. The grinding apparatus according to claim 39, wherein said grinding members further include a central undulating array of grinding members, said central array grinding members being positioned between said inner array of grinding members and said outer array of grinding members.

41. A grinding apparatus having a rotatable member and drivers for rotating the rotatable member about a drive axis and for moving the rotatable member about generally vertical and horizontal pivot axes, the rotatable member having a plurality of grinding members, each of said grinding members comprising:

a body being adapted to mount and to be secured to the rotatable member, said body including a plurality of spaced apart pointed distal ends and a planar mounting surface for mounting to the rotatable member, and said distal ends defining cutting tips for simultaneously cutting in generally horizontal and vertical planes when the drivers rotate the rotatable member about its drive axis and move the rotatable member about the pivot axes.

42. The grinding apparatus according to claim 41, wherein said body includes a concave grinding surface, said concave grinding surface extending between said pointed distal ends.

43. The grinding apparatus according to claim 42, wherein said concave grinding surface includes a rectangular perimeter, a first set of opposed sides of said rectangular perimeter defining a first pair of grinding edges, and a second pair of opposed sides of said rectangular perimeter defining a second set of grinding edges.

44. The grinding apparatus according to claim 43, wherein at least one of said first and second pairs of grinding edges comprises a pair of generally arcuate grinding edges.

45. The grinding apparatus according to claim 42, wherein said concave grinding surface comprises a spherical concave grinding surface.

46. The grinding apparatus according to claim 41, wherein said grinding member has a width to height aspect ratio in a range of about 0.5 to 2.0.

\* \* \* \* \*

UNITED STATES PATENT AND TRADEMARK OFFICE
CERTIFICATE OF CORRECTION

PATENT NO.   : 6,047,749　　　　　　　　　　　　　　　　　　　　　　　　Page 1 of 1
DATED         : April 11, 2000
INVENTOR(S) : Rodney Lamb It is certified that error appears in the above-identified patent and that said Letters Patent is hereby corrected as shown below:

Column 6,
Line 62, "angle a" should be -- angle α -- in the first occurrence

Signed and Sealed this

Ninth Day of April, 2002

Attest:

JAMES E. ROGAN
*Attesting Officer*　　　*Director of the United States Patent and Trademark Office*